May 30, 1950     I. C. McKECHNIE ET AL     2,509,981
POWER TRANSMISSION Filed Jan. 29, 1941     4 Sheets-Sheet 1

INVENTORS
Ian C. McKechnie,
Thomas M. Ball
BY
Harness, Dickey, Patee & Harries
ATTORNEYS.

May 30, 1950  I. C. McKECHNIE ET AL  2,509,981
POWER TRANSMISSION

Filed Jan. 29, 1941  4 Sheets-Sheet 4

FIG. 19.

INVENTORS.
Ian C. McKechnie,
Thomas M. Ball.
BY
Harness, Dick, Patee & Harris
ATTORNEYS.

Patented May 30, 1950

2,509,981

UNITED STATES PATENT OFFICE 2,509,981

POWER TRANSMISSION

Ian C. McKechnie and Thomas M. Ball, Detroit, Mich., assignors to Chrysler Corporation, Highland Park, Mich., a corporation of Delaware Application January 29, 1941, Serial No. 376,510

20 Claims. (Cl. 74—472)

This invention relates to motor vehicles and refers more particularly to power transmission and control mechanism therefor.

Our invention has particular reference to transmission systems in which the torque load is relieved as by momentary interruption of the engine ignition or by other suitable means in order to unload positively engageable drive control elements so as to facilitate disengagement of such elements. One example of such a transmission is described and claimed in the copending application of Carl A. Neracher et al., Serial No. 335,310, filed May 15, 1940, now Patent No. 2,445,943, dated December 14, 1948.

In such transmission systems, the engine ignition when interrupted accommodates disengaging movement of the movable or shiftable drive control element but it sometimes happens that the interrupting mechanism functions to restore the ignition and hence the torque load at the drive control elements before disengagement thereof has been effected. This results in failure of the transmission to function properly. It is, of course, desirable to interrupt the ignition for as brief an interval of time as is necessary and because of many factors it is difficult to arrive at a time interval for setting the ignition interrupting mechanism so that it will function the same under all conditions. Among these factors are variation in oil viscosity, variation in clearance between the drive control elements and the fit of the parts in general, requirements for disengagement of the drive control elements incident to kickdown and bringing the car to a stop, and other factors all of which give rise to the aforesaid failure.

Another difficulty experienced with transmission systems of the aforesaid character is in connection with failure of the ignition interrupting means to restore the ignition to normal operation after it has functioned to interrupt the ignition. This occurs especially in those transmissions employing interrupted switches which open and close by operative connection with some part movable with the shiftable drive control element. Thus, if such element fails to fully release then the ignition stays in its interrupted condition thereby rendering the engine inoperative as well as in failure of the transmission to function normally.

It is an object of our invention to overcome the aforesaid difficulties and failures by insuring disengagement of the movable drive control element under all desired conditions. This not only insures proper functioning of the ignition system and transmission mechanism but also provides for wider latitude in the allowable tolerances and clearances in the manufacture of the mechanism and controls therefor, and renders the device less sensitive to changes in temperature and resulting lubricant viscosity variation.

A further object of our invention is to provide improved and simplified means for controlling the torque-relieving or torque reversing means.

Another object is to provide an improved torque-relieving control which will automatically operate a predetermined length of time, thereby insuring the desired movement of the movable drive control element and preventing undue shortening or prolongation in the time of operation of the torque relief means.

Another object is to provide a torque control which embodies a dashpot or retarding device so as to automatically control torque variation for a length of time determined by the dashpot action.

Another object of our invention is to provide means for varying the action of the retarding device so that the time of torque relief may be varied or adjusted to suit conditions in the transmission operation and design.

Another object is to provide a dashpot control on torque delivery wherein the dashpot action occurs automatically in response to manipulation of the accelerator pedal; also wherein free movement of the pedal is at all times accommodated without interference with the dashpot action.

Further objects and advantages of our invention reside in the novel combination and arrangement of parts more particularly hereinafter described and claimed, reference being had to the accompanying drawings in which:

Fig. 12 is a similar view of the Fig. 11 mechanism corresponding to engaged position of the automatic clutching sleeve.

While our control may be employed in conjunction with various types and arrangements of motor vehicle transmissions, especially where a pair of relatively movable positively engageable drive control elements are employed, in order to illustrate one driving system we have shown our invention in connection with certain salient parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

Figure 1:
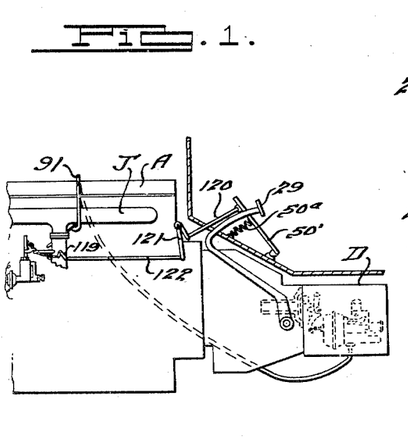
Fig. 1 is a side elevational view showing the motor vehicle engine and power transmission.
Figure 2:
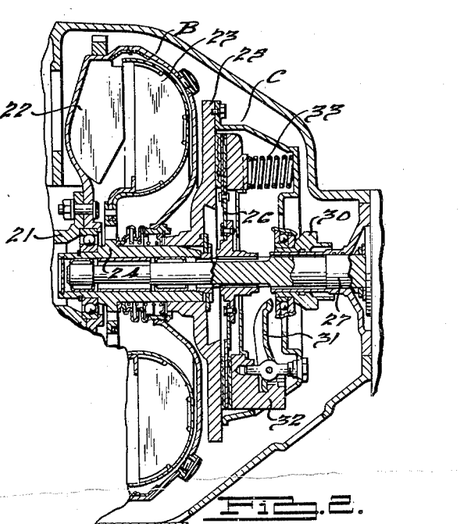
Fig. 2 is a longitudinal sectional elevational view through the main clutching mechanism.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an overrunning clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Figure 3:
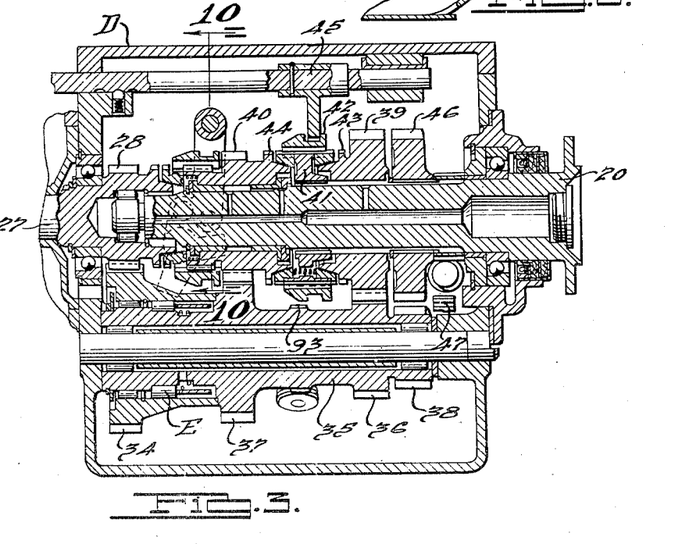
Fig. 3 is a similar view through the change speed transmission.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28, thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutch shaft 27 directly to gear 40. This sleeve F is adapted to step-up the speed ration drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50' thereby allowing spring 50ª to close the engine throttle valve and cause the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A unitary blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

Figure 5:
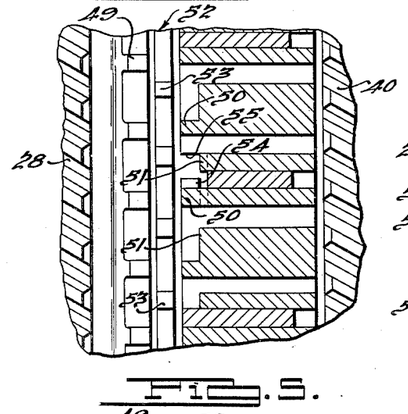
Fig. 5 is a sectional plan view illustrated as a development according to line 5—5 of Fig. 4, the automatic clutching sleeve being released.

During drive in first and third, the speed of shaft 27 exceeds the speed of gear 40 so that, if sleeve F is fully released, the parts will be positioned as in Fig. 5 wherein the blocker teeth 53 are in axial alignment with the short teeth 51. If now the sleeve F is urged forwardly it will move to the Fig. 6 position of drive blocking and will remain in this blocked position as long as the engine drives the car in first or third.

Figure 7:
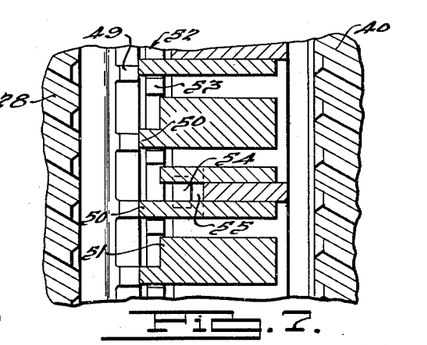
Fig. 7 is a similar view showing the automatic clutching sleeve in its coasting relationship for the Fig. 6 showing, the clutching sleeve being unblocked during coast for its clutching movement.
Figure 8:
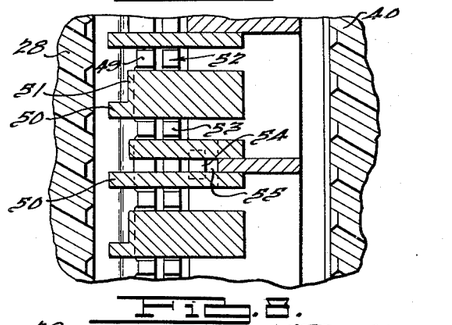
Fig. 8 is a similar view showing the automatic clutching sleeve in full clutching engagement.

If now the driver releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50, as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

Figure 6:
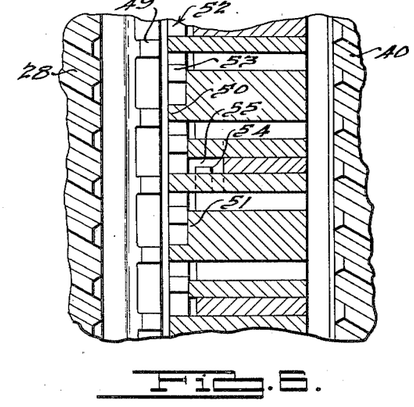
Fig. 6 is a similar view showing the automatic clutching sleeve in its intermediate shift position during the drive blocking condition.
Figure 9:
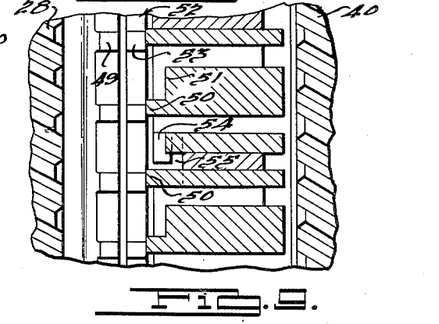
Fig. 9 is a view similar to Fig. 5 but showing the automatic clutching sleeve in its other intermediate shift position during the coast blocking condition.

In the event that sleeve F is urged forwardly from its Fig. 6 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manual shiftable sleeve 42. Then on releasing the accelerator pedal the sleeve F will synchronously clutch with teeth 49 during coast to step-up the drive to either second or fourth as aforesaid.

Figures 10, 11:
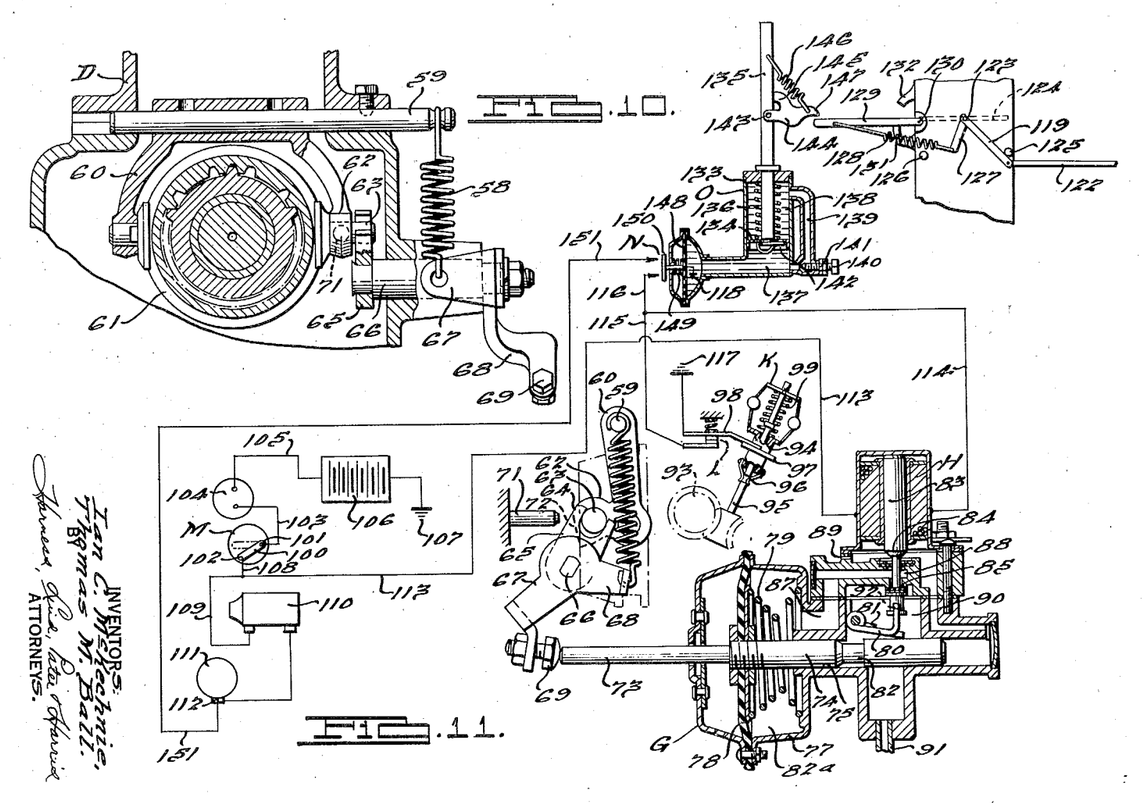
Fig. 10 is a sectional elevational view taken approximately as indicated by line 10—10 in Fig. 3 but showing only the upper portion of the transmission mechanism and particularly the lower operation mechanism for the automatic clutching sleeve when in its engaged position.
Fig. 11 is a diagrammatic view of the control mechanism for the automatic clutching sleeve, the latter being shown in its released position.

The transmission is provided with suitable prime mover means for controlling shift of sleeve F along with several control means. Referring particularly to Figs. 11 and 12, there is illustrated a pressure fluid operated motor G utilizing air pressure for its operation. For convenience this motor is arranged to operate by the "vacuum" in the intake manifolds system of the engine under control of electromagnetic means illustrated in the form of a solenoid H. The term "vacuum" is commonly used to denote pressures less than atmospheric and it is in this sense that we use this term and not in the strict sense of zero pressure or absolute vacuum.

Forward shift of sleeve F is effected, under control of motor G, by reason of a spring 58 having its upper end fixed by engaging the outboard portion of a transverse shaft 59 fixed in the housing of transmission D. Mounted to freely rock on shaft 59 is a shift yoke 60 which engages the shift groove 61 of sleeve F, this yoke having one of its arms provided with a forward extending lever 62 carrying a lateral pin 63 which engages the yoke portion 64 of an upstanding lever 65. This lever 65 is fixed to the inboard end of a rockshaft 66 the outboard end of which has fixed thereto a bell-crank follower lever member having lever arms 67 and 68. The end of lever 68 is connected to the lower end of spring 58 and lever 67 carries an adjustable abutment 69 for adjusting the lost-motion at gap 70 (Fig. 12) as will presently be apparent.

Spring 58 acts to yieldingly urge engagement of sleeve F, acting through lever 68, shaft 66 and lever 65, to cause pin 63 to swing yoke 60 forwardly on its shaft 59 until, when sleeve F is fully engaged, a stop pin 71 engages the forward flat face 72 of lever 62. This limits rearward swing of lever 67.

Arranged for engaging the abutment 69 during its arcuate movement about the axis of shaft 66, is a thrust-imparting leader member in the form of a reciprocatory rod 73 having an enlarged central portion 74 slidably supported in the bore 75 of motor G.

Motor G comprises a cylinder 77 which contains a differential pressure and spring operated member 78, herein illustrated as the diaphragm type. This member has its outer portion secured to cylinder 77 and its central portion fixed to the rod 73, the member 78 and rod being urged forwardly in a direction to release sleeve F by a spring 79 which is much stronger than spring 58. A suitable type of releasable holding means is provided for rod 73 so as to releasably hold this rod and member 78 rearwardly retracted to their Fig. 12 positions against the action of spring 79 until it is desired to urge disengagement of sleeve F. This releasable holding means is illustrated in the form of a latch 80 which, under the action of a rat-trap spring 81, catches on the rearward shoulder of a detent 82 in rod portion 74 as in Fig. 12. At this time leader rod 73 moves rearwardly further than follower lever 67 by the amount of the aforesaid gap 70 such that on releasing latch 80 the rod 73 may move forwardly the amount of this gap without requiring sleeve F to move from its engaged position toward its disengaged position.

The vacuum supply to the working chamber 82ª is under control of the aforesaid solenoid H which comprises an armature plunger 83 having valving parts 84, 85. In Fig. 11 the solenoid H is energized thereby raising plunger 83 against spring 86 to seat valve 85 and shut off the vacuum supply to chamber 82ª and at the same time unseat valve 84 so as to vent this chamber through passage 87, chamber 88 and vent passage 89. When the solenoid is de-energized then spring 86 lowers plungers 83 thereby seating valve 84 to shut off vent 89 and open valve 85 as in Fig. 12 thereby opening chamber 82ª to the engine intake manifold J through passage 87, chamber 88, chamber 90 and pipe 91.

A certain lost motion is provided between plunger 83 and the inwardly bent finger 92 of latch 80 so that when the plunger moves downwardly the latch may subsequently catch at detent 82 when vacuum operates member 78, the parts then remaining in the Fig. 12 position independently of vacuum in chamber 82 until solenoid H is energized to release the latch and vent chamber 82.

It is deemed preferable to provide a speed control on the energization of solenoid H so as to insure automatic release of sleeve F below a predetermined car speed and to accommodate automatic engagement of sleeve F above a predetermined car speed. Whenever the car is in forward driving condition the manual sleeve 42 is either shifted rearwardly to the low range or forwardly to the high range so that by driving a governor form the countershaft 35 it is possible to provide a speed control operated proportionate to the speed of travel of the car. Driven from countershaft gear 93 is a governor K of any suitable type, this governor operating a sleeve 94 outwardly along its drive shaft 95 as the car speed reaches a predetermined point, the break-away being under control of a detent 96 if desired.

The sleeve 94 has a shoulder 97 engaged by the swinging switch piece 98 of the governor switch L. When the car is stationary the detent 96 is engaged and switch L is closed. As the car accelerates the governor eventually reaches its critical speed and detent 96 releases thereby causing switch L to open. As the car slows down, the governor spring 99 restores the parts to the Fig. 11 position and by proportioning the various parts it is obvious that switch L may be made to function at desired speeds proportionate to car travel. As an example of one arrangement of governor operation and gearing arrangement, the governor may be made to open switch L during car acceleration in first and third respectively at approximately 7 and 15 M. P. H. (miles per hour), the switch L closing on stopping the car in direct and second at approximately 7 and 3 M. P. H. respectively.

The driver operation ignition switch is designated at M and comprises a conductor 100 which, in the Fig. 11 position showing the switch "on" or closed, electrically connects contacts 101 and 102. Contact 101 extends by conductor 103 to ammeter 104 and thence by conductor 105 to the usual storage battery 106 and thence to ground 107. Contact 102 has a conductor 108 extending by conductor 109 branching therefrom to the engine ignition system herein shown in part as comprising coil 110 and distributor 111 having the primary terminal 112.

A second conductor 113 branches from conductor 108 to the solenoid H and thence by conductor 114 to two conductors 115 and 116, the former extending to governor switch L and thence to ground 117. Conductor 116 extends to the combined kickdown interrupter switch N and thence to ground 118. The switch N is normally open and is closed preferably in response to a full depression of accelerator pedal 50'. Pedal 50' is operably connected with the engine throttle valve lever 119 by suitable linkage 120, 121, and 122 such that depressing the pedal will cause lever 119 to swing on its pivot shaft 123, to which it is fixed, and move the throttle valve 124 from its Fig. 10 closed position to its Fig. 11 fully open position, stop 125 and 126 limiting swing of lever 119. Also fixed to throttle shaft 123 is a second lever 127 connected to one end of an over-center tension spring 128 the other end of which is connected to a lever 129 having an end pivotally supported at 130 to accommodate movement of lever 129 between stops 131 and 132. The parts are so arranged that as pedal 50' is fully depressed, just as lever 119 approaches its maximum throttle opening position against stop 126 then lever 127 will have been moved in over-center relationship with respect to pivot 130 and spring 128 whereby spring 128 will cause lever 129 to suddenly snap upwardly from its Fig. 11 position against stop 128 to its Fig. 12 position against stop 132. This movement of lever 129 is utilized to control switch N. As pedal 50' is released then lever 127 moves to cause spring 129 to snap back again to its Fig. 11 position.

Suitably mounted in proximity to the throttle 124 and usual carburetor (not shown) is a dashpot O comprising a cylinder 133 having therein a piston 134 connected to a piston rod 135. A spring 136 yieldingly maintains the piston in its Fig. 11 position. The cylinder 133 contains a suitable liquid, the space below the piston comprising a dashpot chamber 137 and the space above the chamber comprising a reservoir chamber 138, these chambers being connected by a by-pass 139. A valve 140 is threadedly adjustable, upon releasing lock nut 141, so that any desired amount of restriction may be obtained to the flow of the liquid from chamber 137 to chamber 138 thereby retarding downward movement of the piston 134. Upward movement of this piston is freely accommodated by a check valve 142 which allows the liquid to freely flow only one way from chamber 138 to chamber 137.

Mounted to pivot at 143 on rod 135 is a latch 144 having a stop 145 engaged with the rod by a spring 146. This latch has a finger portion 147 so arranged as to be engaged by upward swing of lever 129 when piston 134 is in its position of rest as in Fig. 11. When lever 129 so moves, latch 144 moves upwardly without rotating on pivot 143 because of stop 145, rod 135 and piston 134 being lifted until lever 129 swings clear of finger 147 just prior to engaging stop 132 thereby leaving the spring 136 free to move the piston downwardly with retarded or dashpot action and accompanying rise in pressure of the fluid in chamber 137. If, after starting the dashpot action by a full depression of pedal 50', the operator releases this pedal prior to completion of the downward travel of piston 134 then latch 144 swings on its pivot 143 to allow lever 129 to move against stop 131 without interfering with the dashpot action. Likewise latch 144 swings to accommodate restoring the parts to the Fig. 11 positions if pedal 50' is released after the dashpot stroke has been completed.

The pressure rise in chamber 137 is utilized to act on a diaphragm 148 to close switch N against the restoring action of spring 149. For this purpose the diaphragm 148 carries the conductor switch bridge piece 150 for not only grounding conductor 116 at 118 but also grounding a conductor 151 leading from the distributer primary terminal 112. Therefore, when switch N is closed the engine ignition system is grounded and rendered inoperative to relieve or reverse the torque at the transmission D, the length of time of the interruption depending on the setting of the valve 140 which restricts the liquid flow from chamber 137 to chamber 138. Also, when the pedal 50' is depressed for the fully open throttle position, switch N is closed to effect a step-down in the transmission from fourth to third or from second to first by energizing solenoid H.

The governor solenoid circuit is as follows: ground 107 to battery 106 thence by conductor 105 to ammeter 104 and by conductor 103 to ignition switch M. From switch M this circuit extends through conductors 108 and 113 to solenoid H and thence by conductors 114 and 115 to switch L and ground 117.

The kickdown solenoid circuit is the same as the governor solenoid circuit to conductor 114 whence this circuit extends by conductor 116 to kickdown switch N and ground 118.

The engine ignition circuit is the same as the governor solenoid circuit up to the conductor 108 whence this circuit extends by conductor 109 to coil 110 and distributer 111.

It will be apparent that when the car is being driven in fourth or second, a full depression of pedal 50' will automatically set the dashpot O into operation and cause switch N to close for a predetermined length of time. This causes the ignition system to ground thereby relieving the thrust-application between the teeth of sleeve F and the teeth 49 facilitating movement of the drive-control sleeve element F from its Fig. 12 position of engaging relationship to its Fig. 11 position of disengaging relationship with respect to teeth 49. At the same time, closing switch N energizes solenoid H to cause plunger 83 to move upwardly to release latch 80 from detent 82. Heretofore gap 70 is utilized to allow rod 73 to move relative to sleeve F and by this movement close an interrupter switch, as in the aforesaid Neracher et al. application. However, our switch N closes without requiring rod 73 to first move so that gap 70 is now unnecessary but may be provided to assist in assembling the mechanism with necessary overall clearance for operation. Some form of lost motion between sleeve F and member 78 is desirable to allow rod 73 to latch in advance of clutching of sleeve F.

Figure 4:
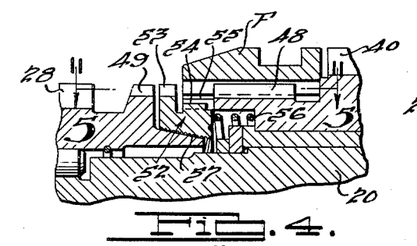
Fig. 4 is a detail enlarged view of the blocker clutch as seen in Fig. 3.

When the latch 80 is released, with the parts positioned as in Fig. 12, sleeve F being clutched, spring 79 operates to thrust follower lever 67 for acting through lever 64 and yoke 60 to urge sleeve F rearwardly into its Fig. 4 position of disengagement with respect to the pinion teeth 49.

Our arrangement insures against any possibility of the ignition being either grounded for too short a time or from being permanently grounded in the event that sleeve F should fail to fully release in response to the kickdown operation. This piston 134, after being lifted by lever 129, is bound to complete its downward stroke whereupon the pressure in chamber 137 falls off automatically opening switch N and restoring the ignition. After kickdown and when switch N is opened by completion of the downward travel of piston 134, solenoid H is de-energized to retract rod 73 by vacuum in chamber 82ª to the Fig. 12 latched position, assuming the car speed to be such that governor switch L remains open, and when the driver releases pedal 50' sufficiently to allow the engine to coast down to synchronize the speed of pinion 28 with sleeve F, then spring 58 will act to clutch sleeve F with teeth 49 thereby to restore either fourth or second speed drive. Of course, if the pedal 50' is released insufficiently to cause overrun at clutch E then the drive will continue in the kickdown ratio of third or first depending on the shift position of sleeve 42.

In bringing the car to rest, from drive in fourth or second, governor switch L closes and solenoid H is energized to cause chamber 82ª to vent as in kickdown. When the torque falls off at sleeve F, as in bringing the car to a stop, then sleeve F will disengage to insure drive in third or first when the pedal 50' is next depressed. If sleeve F should not release on stopping, it will release the instant the torque load is reversed at sleeve F as in depressing pedal 50' for accelerating the car. In any event the car will always start from rest in either first or third.

In the operation of the mechanism, the car at standstill and with the ignition switch N closed and the engine idling will cause the solenoid H to be energized as in Fig. 11 because governor switch K is closed thereby establishing the governor solenoid circuit. Chamber 82ª is vented and sleeve F disengaged. The driver shifts sleeve 42 to either the high or low range and accelerates the car ordinarily above the critical speed of governor K thereby causing switch L to open to break the governor solenoid circuit. As vacuum builds up in the engine intake manifold J, plunger 83 now being lowered by spring 86 because switch L is open, member 78 will be operated by vacuum thereby moving rod 73 to its Fig. 12 latched position. As soon as the driver allows the engine to coast, sleeve F will engage teeth 49 synchronously, to step-up the drive to either second or fourth although the step-up will be delayed by the blocker 52 until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor K directs a downshift on bringing the car to rest. Thus there is automatically provided a favorable torque-multiplying gearing for starting, as in third.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

We claim:

1. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; control means operable to cause relief of said thrust-application; pressure fluid controlled switch operating means, including an operating element adapted for fluid retarded movement over a predetermined time interval, operable to momentarily effect said operation of said control means for a period proportionate to said time interval; and means for operating said switch operating means.

2. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; control means operable to cause relief of said thrust-application; pressure fluid controlled switch operating means operable with fluid retarded action to effect operation of said control means; engine throttle control means adapted for operation by the vehicle driver; and means responsive to operation of said throttle control means for effecting operation of said switch operating means.

3. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; control means operable to cause relief of said thrust-application; pressure fluid controlled switch operating means operable with fluid retarded action to effect operation of said control means; an engine throttle control member adapted for manipulation under control of the vehicle driver; and means responsive to manipulation of said throttle control member in open direction for effecting operation of said switch operating means.

4. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; control means operable to cause relief of said thrust-application; pressure fluid controlled switch operating means operable with fluid retarded action to effect operation of said control means; an engine throttle control means adapted for manipulation under control of the vehicle driver; and means responsive to manipulation of said throttle control member to the limit of its movement in the direction of throttle opening for effecting operation of said switch operating means.

5. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; control means operable to cause relief of said thrust-application; a member movable with retarded action from a first position thereof to a second position thereof; differential fluid pressure means operating to retard movement of said member from its said first position to its said second position; means responsive to movement of said member from its said first position to its said second position for effecting operation of said control means; and means for moving said member from its said second position to its said first position.

6. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; control means operable to cause relief of said thrust-application; a member movable with retarded action from a first position thereof to a second position thereof; differential fluid pressure means operating to retard movement of said member from its said first position to its said second position; means responsive to movement of said member from its said first position to its said second position for effecting operation of said control means; engine throttle control means adapted for operation by the vehicle driver; and means responsive to operation of said throttle control means for effecting movement of said member from its said second position to its said first position.

7. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; control means operable to cause relief of said thrust-application; a member movable with retarded action from a first position thereof to a second position thereof; means operating to retard movement of said member from its said first position to its said second position; means responsive to movement of said member from its said first position to its said second position for effecting operation of said control means; an engine throttle control member adapted for manipulation under control of the vehicle driver; and means responsive to manipulation of said throttle control member in open direction for effecting operation of said member from its said second position to its said first position.

8. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; a switch comprising a switch element adapted for operation from a first position to a second position thereof; means operating when said switch element is in its said second position for biasing said movable element into said disengaging relationship; means responsive to operation of said switch element from its said first position to its said second position and then to its said first position for causing momentary relief of said thrust-application; and differential pressure applying means for operating said switch element as aforesaid.

9. In a drive for a motor vehicle having an engine provided with an ignition system; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; a switch comprising a switch element adapted for operation from a first position to a second position thereof; means operating when said switch element is in its said second position for biasing said movable element into said disengaging relationship; means responsive to operation of said switch element from its said first position to its said second position and then to its said first position for rendering said ignition system momentarily inoperative thereby to cause momentary relief of said thrust-application; and differential pressure-fluid applying means for operating said switch element as aforesaid.

10. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; a switch comprising a switch element adapted for operation from a first position to a second position thereof; means operating when said switch element is in its said second position for biasing said movable element into said disengaging relationship; means responsive to operation of said switch element from its said first position to its said second position and then to its said first position for causing momentary relief of said thrust-application; engine throttle control means adapted for operation by the vehicle driver; and pressure fluid applying means operating in response to operation of said throttle control means for effecting operation of said switch element as aforesaid.

11. In a drive for a motor vehicle having an engine provided with an ignition system; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged bing subject to thrust-application therebetween during said drive so as to resist relative disengagement thereof until said thrust-application is relieved; a switch comprising a switch element adapted for operation from a first position to a second position thereof; means operating when said switch element is in its said second position for biasing said movable element into said disengaging relationship; means responsive to operation of said switch element from its said first position to its said second position and then to its said first position for rendering said ignition system momentarily inoperative thereby to cause momentary relief of said thrust-application; engine throttle control means adapted for operation by the vehicle driver; and pressure fluid applying means operating in response to operation of said throttle control means for effecting operation of said switch element as aforesaid.

12. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; a switch comprising a switch element adapted for operation from a first position to a second position thereof; means operating when said switch element is in its said second position for biasing said movable element into said disengaging relationship; means responsive to operation of said switch element from its said first position to its said second position and then to its said first position for causing momentary relief of said thrust-application; means for biasing said switch element to its said first position; and pressure fluid controlled switch operating means for operating said switch element from its said first position to its said second position.

13. In a drive for a motor vehicle having an engine provided with an ignition system; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; a switch comprising a switch element adapted for operation from a first position to a second position thereof; means operating when said switch element is in its said second position for biasing said movable element into said disengaging relationship; means responsive to operation of said switch element from its said first position to its said second position and then to its said first position for rendering said ignition system momentarily inoperative thereby to cause momentary relief of said thrust-application; means for biasing said switch element to its said first position; pressure fluid controlled switch operating means adapted to be tripped for operating said switch element from its said first position to its said second position and for maintaining said switch element in its said second position with delayed action; trip means operable to effect said operation of said switch operating means; engine throttle control means adapted for operation by the vehicle driver; and means responsive to manipulation of said throttle control member in open direction for effecting said operation of said trip means.

14. In a drive for a motor vehicle having an engine provided with an ignition system; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; a switch comprising a switch element movable from a first position to a second position thereof; means for biasing said switch element to its said first position; means for effecting interruption of said ignition system when said switch element is in its said second position thereby to cause relief of said thrust-application; and means operable to move said switch element from its said first position to its said second position, including pressure fluid controlled switch operating means operable to cause said operation of said switch element moving means so as to maintain said switch element in its said second position for a predetermined length of time.

15. In a drive for a motor vehicle having an engine provided with an ignition system; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; a switch comprising a switch element movable from a first position to a second position thereof; means for biasing said switch element to its said first position; means for effecting interruption of said ignition system when said switch element is in its said second position thereby to cause relief of said thrust-application; engine throttle control means adapted for operation by the vehicle driver; and pressure fluid controlled switch operating means operable in response to driver operation of said throttle control means to move said switch element from its said first position to its said second position and to maintain said switch element in its said second position for a predetermined length of time.

16. In a drive for a motor vehicle having an engine provided with an ignition system; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; a switch comprising a switch element movable from a first position to a second position thereof; means for biasing said switch element to its said first position; means for effecting interruption of said ignition system when said switch element is in its said second position thereby to cause relief of said thrust-application; means including a dashpot operating to move said switch element from its said first position to its said second position and to maintain said switch element in its said second position for a predetermined time during operation of the dashpot, said dashpot including a dashpot piston, a spring biasing said dashpot piston for movement thereof in a direction for effecting operation of said dashpot switch element moving means as aforesaid, an operating element operably connected to said dashpot piston and adapted for tripping movement for loading said spring preparatory to said movement of said dashpot piston in said direction, and a trip element connected to said operating element; an overcenter spring operating lever adapted, during operation thereof in one of its directions of movement, to act on said trip element thereby to impart said tripping movement to said operating element, and, during return operation thereof, to move relative to said operating element by swinging said trip element on its said pivot; an engine throttle control member adapted for manipulation under control of the vehicle driver; and means responsive to manipulation of said throttle control member to the limit of its movement in the direction of throttle opening to cause operation of said lever in said one direction as aforesaid.

17. In a drive for a motor vehicle according to claim 8; means responsive to predetermined speed of travel of the vehicle for effecting operation of said element-biasing-means as aforesaid independently of movement of said switch element from its said first position to its said second position.

18. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof until said thrust-application is relieved; a control element operable between two predetermined positions of control; means operating automatically in response to operation of said control element from one of its said positions to the other of its said positions during said drive for effecting bias of said movable drive-control element toward said disengaging relationship, including dashpot means operating in accompaniment with said bias of said movable drive-control element to effect momentary relief of said thrust-application for a predetermined period of time.

19. In a drive for a motor vehicle having an engine provided with an ignition system; a change speed transmission adapted to be driven by said engine and operable upon momentary relief of input torque theerto to provide a change in the speed ratio drive for the vehicle; pressure fluid controlled switch operating means operable with fluid retarded action to effect momentary interruption of said ignition system thereby relieving the input torque as aforesaid; and means for effecting variation in the operation of said switch operating means so as to vary the length of time of said momentary interruption.

20. In a drive for a motor vehicle having an engine provided with an ignition system; a change speed transmission adapted to be driven by said engine and operable upon momentary relief of input torque thereto to provide a change in the speed ratio drive for the vehicle; means biasing said switch to one of its said positions; an ignition control switch movable between two positions thereof to effect momentary interruption of said ignition system thereby relieving the input torque as aforesaid; and pressure fluid controlled switch operating means operating with retarded action to overcome said biasing means and effect movement of said switch to the other of said positions; said biasing means operating to restore said switch to its said one position subsequently to said operation of said switch operating means.

IAN C. McKECHNIE.
THOMAS M. BALL.

REFERENCES CITED

The following references are of record in the file of this patent:

UNITED STATES PATENTS

| Number | Name | Date |
|---|---|---|
| 909,813 | Murphy | Jan. 12, 1909 |
| 1,377,002 | Centrall | May 3, 1921 |
| 1,646,764 | Queeney | Oct. 25, 1927 |
| 1,742,719 | Nafziger | Jan. 7, 1930 |
| 1,768,390 | Wing | June 24, 1930 |
| 2,106,607 | Kelley | Jan. 25, 1938 |
| 2,115,125 | Sinclair | Apr. 26, 1938 |
| 2,214,099 | Claytor | Sept. 10, 1940 |
| 2,214,100 | Claytor | Sept. 10, 1940 |
| 2,251,700 | Beardslee et al. | Aug. 5, 1941 |
| 2,257,838 | Claytor | Oct. 7, 1941 |
| 2,322,479 | Schjolin | June 22, 1943 |
| 2,332,593 | Nutt et al. | Oct. 26, 1943 |

FOREIGN PATENTS

| Number | Country | Date |
|---|---|---|
| 457,269 | Great Britain | Nov. 14, 1936 |

Certificate of Correction

Patent No. 2,509,981 May 30, 1950

IAN C. McKECHNIE ET AL.

It is hereby certified that error appears in the printed specification of the above numbered patent requiring correction as follows:

Column 4, line 32, for the word "ration" read *ratio*; column 5, line 72, for "manifolds" read *manifold*; column 6, line 11, for "forward" read *forwardly*; line 69, for "plungers" read *plunger*; column 7, line 17, for "form" read *from*; column 10, line 9, for "N" read *M*; column 14, line 8, for "bing" read *being*; column 17, line 7, for "theerto" read *thereto*;

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*